(12) United States Patent
Ramakrishnan

(10) Patent No.: US 10,176,368 B1
(45) Date of Patent: Jan. 8, 2019

(54) VEHICLE REAR DOOR CONTROL SYSTEM

(71) Applicant: Nissan North America, Inc., Franklin, TN (US)

(72) Inventor: Avinaash Ramakrishnan, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/793,312

(22) Filed: Oct. 25, 2017

(51) Int. Cl.
| | |
|---|---|
| *G06K 9/00* | (2006.01) |
| *E05B 81/78* | (2014.01) |
| *E05F 15/78* | (2015.01) |
| *G07C 9/00* | (2006.01) |
| *B60Q 1/26* | (2006.01) |
| *B60Q 1/50* | (2006.01) |
| *E05F 15/73* | (2015.01) |

(52) U.S. Cl.
CPC ....... *G06K 9/00382* (2013.01); *B60Q 1/2669* (2013.01); *B60Q 1/50* (2013.01); *E05B 81/78* (2013.01); *E05F 15/78* (2015.01); *G07C 9/00309* (2013.01); *E05F 2015/765* (2015.01); *E05Y 2400/858* (2013.01); *E05Y 2900/531* (2013.01); *G07C 2009/00507* (2013.01); *G07C 2209/64* (2013.01)

(58) Field of Classification Search
CPC .... G06K 9/00382; B60Q 1/50; B60Q 1/2669; E05B 81/78; G07C 9/00309; G07C 2009/00507; G07C 2209/64; E05F 15/78; E05F 2015/765; E05Y 2900/531; E05Y 2400/858
See application file for complete search history.

(56) References Cited

U.S. PATENT DOCUMENTS

| | | | |
|---|---|---|---|
| 6,292,100 B1 | 9/2001 | Dowling | |
| 7,688,179 B2 | 3/2010 | Kurpinski et al. | |
| 9,002,589 B2 | 4/2015 | Reime | |
| 9,460,575 B2 * | 10/2016 | Park | G07C 9/00134 |
| 9,721,408 B2 | 8/2017 | Obata et al. | |
| 9,951,549 B2 * | 4/2018 | Tofilescu | E05F 15/73 |
| 2008/0068145 A1 | 3/2008 | Weghaus et al. | |
| 2013/0113614 A1 | 5/2013 | Yopp | |

(Continued)

FOREIGN PATENT DOCUMENTS

WO     2016-004460 A1     1/2016

*Primary Examiner* — Nader Bolourchi
(74) *Attorney, Agent, or Firm* — Global IP Counselors, LLP

(57) ABSTRACT

A rear door control system includes an electronic controller connected to a rear door movement device, a keyfob sensor array, a movement detection sensor, and a projector. The electronic controller determines whether or not a movement gesture made by the individual standing within a prescribed location relative to the rear door is a conforming gesture, and in response to determining that the movement gesture is a conforming gesture, the electronic controller operates the rear door movement device to open the rear door in further response to a determination that the authorized keyfob is present. As well, in response to determining that the movement gesture is not a conforming gesture, the electronic controller operates the projector to project an image indicating that the movement gesture is not a conforming gesture, leaving the rear door in the closed orientation.

20 Claims, 11 Drawing Sheets

(56) References Cited

U.S. PATENT DOCUMENTS

| | | |
|---|---|---|
| 2013/0151084 A1 | 6/2013 | Lee |
| 2013/0169408 A1 | 7/2013 | Endo |
| 2015/0298598 A1 | 10/2015 | Nussli |
| 2016/0306062 A1 | 10/2016 | Keene et al. |
| 2017/0130510 A1* | 5/2017 | Nania ................ B62D 33/0273 |
| 2017/0200335 A1 | 7/2017 | Da Deppo et al. |
| 2017/0306684 A1* | 10/2017 | Baruco ................... E05F 15/43 |
| 2017/0321468 A1* | 11/2017 | Frapsauce ............... E05F 15/73 |
| 2018/0065545 A1* | 3/2018 | McMahon ............... B60Q 1/50 |

* cited by examiner

VEHICLE REAR DOOR CONTROL SYSTEM

BACKGROUND

Field of the Invention

The present invention generally relates to vehicle rear door control system. More specifically, the present invention relates to vehicle rear door control system that includes an electronic controller that evaluates multiple sensors and determines whether or not a movement gesture is a conforming gesture that will enable the electronic controller to open the rear door.

Background Information

Many vehicles, such as passenger vans and SUVs, have rear doors that can be opened automatically in response to a movement gesture made by an individual standing near the rear of the vehicle.

SUMMARY

One object of the present disclosure is provide an automatic rear door control system with movement gesture evaluating logic and a projector to project images representing faults in the movement gesture.

In view of the state of the known technology, one aspect of the present disclosure is to provide a rear door control system that includes a vehicle body structure, a rear door movement device, a keyfob sensor array, a movement detection sensor, a projector and an electronic controller. The vehicle body structure has an opening and a rear door that is movable between a closed orientation covering the opening and an open orientation exposing the opening. The rear door movement device is configured to move the rear door between the closed orientation and the open orientation. The keyfob sensor array is installed to the vehicle body structure configured to detect proximity of an individual with an authorized keyfob. The movement detection sensor is installed to the vehicle body structure below the rear door. The projector is installed to the vehicle body structure proximate the rear door and aimed to project images to a ground surface rearward of the vehicle body structure proximate the rear door. The electronic controller connected to rear door movement device, the keyfob sensor array, the movement detection sensor, and the projector. The electronic controller determines whether or not an authorized keyfob is present in response to signals from the keyfob sensor array. The electronic controller determines whether or not a movement gesture made by the individual standing within a prescribed location relative to the rear door is a conforming gesture, and in response to determining that the movement gesture is a conforming gesture, the electronic controller operates the rear door movement device to open the rear door in further response to a determination that the authorized keyfob is present. In response to determining that the movement gesture is not a conforming gesture, the electronic controller also operates the projector to project an image indicating that the movement gesture is not a conforming gesture, leaving the rear door in the closed orientation.

BRIEF DESCRIPTION OF THE DRAWINGS

Referring now to the attached drawings which form a part of this original disclosure.

DETAILED DESCRIPTION OF EMBODIMENTS

Figure 1:
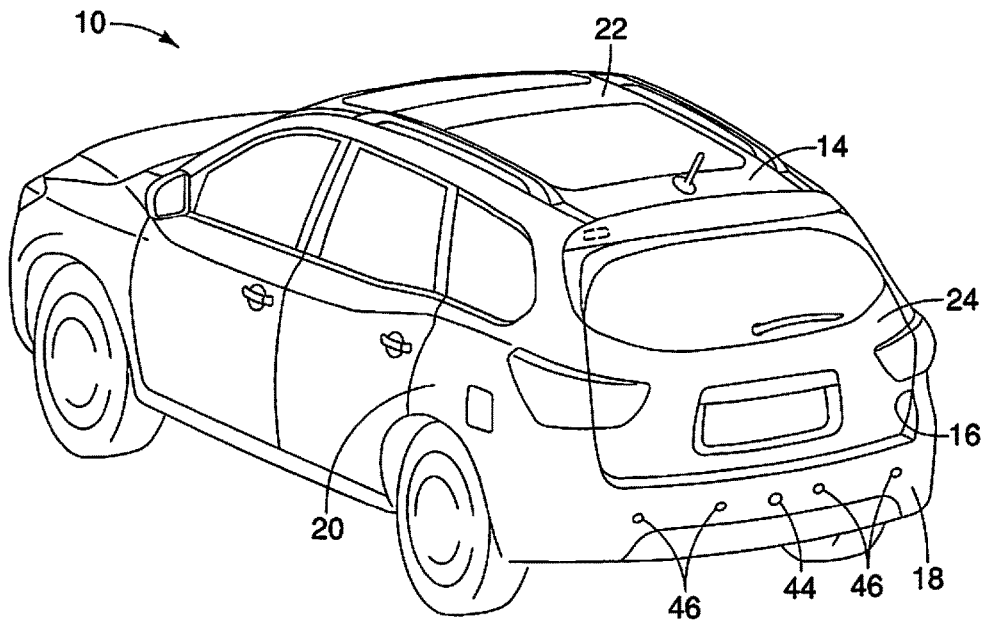
FIG. 1 is a perspective view of a rear portion of a vehicle that includes a rear door control system, showing a rear door in a closed orientation in accordance with a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 is illustrated in accordance with a first embodiment. The vehicle 10 includes a vehicle rear door control system 12 (FIG. 5) that is described in greater detail below.

The vehicle 10 includes a vehicle body structure 14 that defines a plurality of door openings, including a rear hatch opening 16, hereinafter referred to as the opening 16. The vehicle body structure 14 further includes, among other features, a rear bumper assembly 18, side structures 20, a roof structure 22, and a rear door 24 (a rear hatch cover) that is movable between a closed orientation shown in FIGS. 1 and 3 covering the opening 16, and an open orientation shown in FIG. 2, exposing the opening 16.

Figure 3:
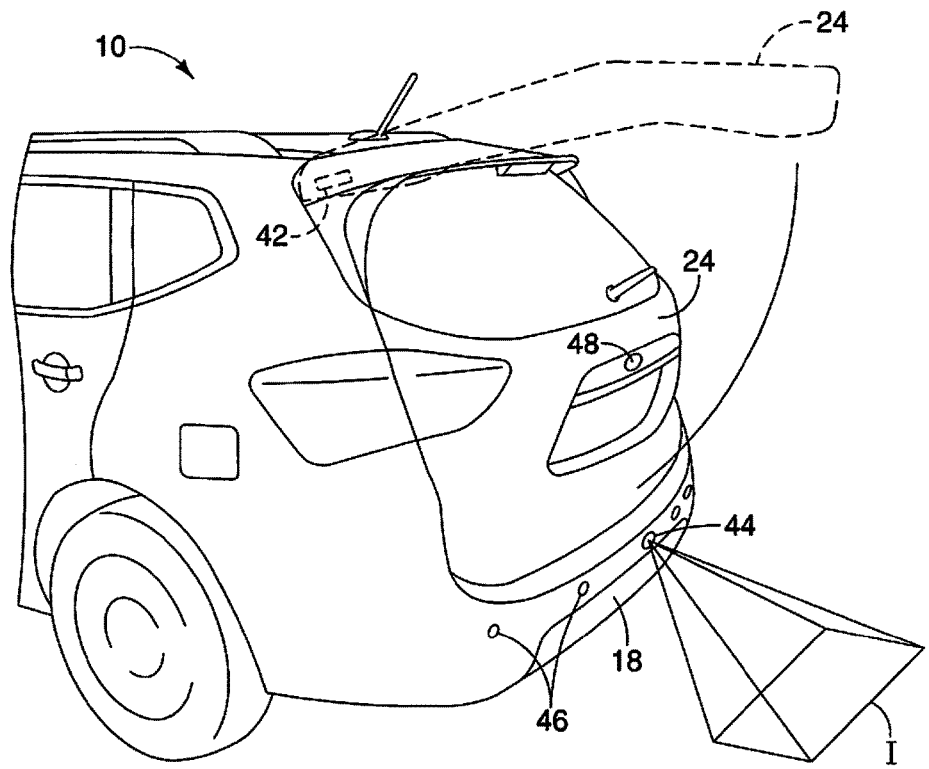
FIG. 3 is yet another perspective view of the rear portion of the vehicle showing a projector installed to the vehicle projecting an image on the ground rearward of the vehicle in accordance with the first embodiment.
Figure 4:
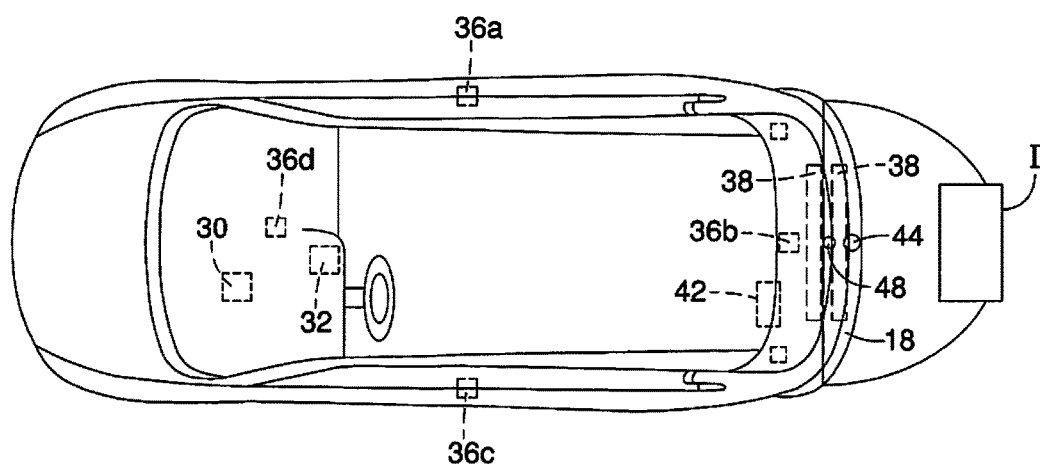
FIG. 4 is a top view of the vehicle showing various sensors installed to the vehicle, with the projector projecting the image on the ground rearward of the vehicle in accordance with the first embodiment.
Figure 5:
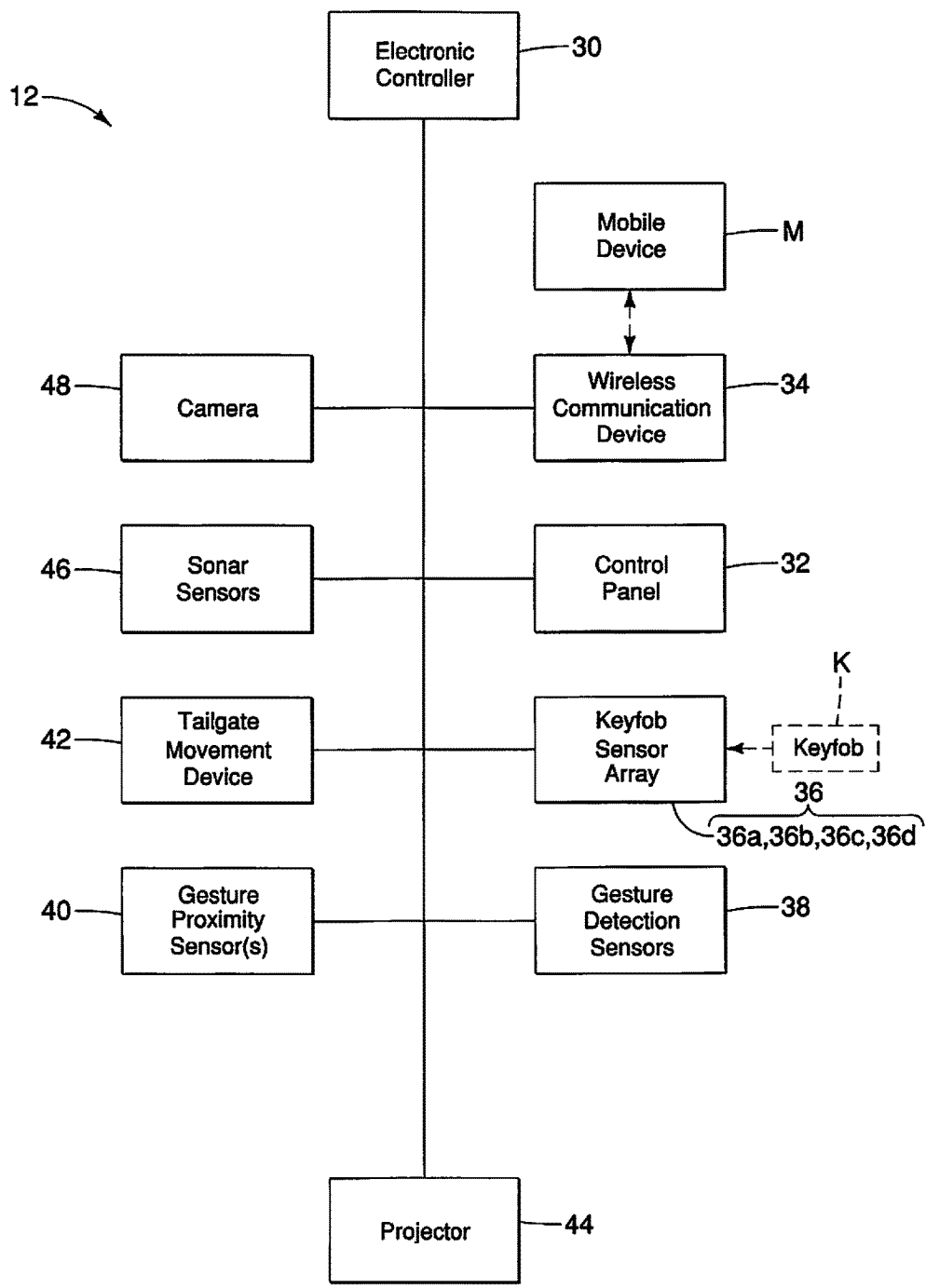
FIG. 5 is a block diagram showing features of the rear door control system including an electronic controller, a control panel, a wireless communication device, a keyfob sensor array, gesture detection sensors, proximity sensor(s), a tailgate movement device, the projector, sonar sensors and a camera.

A description of the vehicle rear door control system 12 is now provided with specific reference to FIGS. 3-5. The vehicle rear door control system 12 basically includes an electronic controller 30 (FIG. 5), a control panel 32, a wireless communication device 34, a keyfob sensor array 36, a movement detection sensor 38, proximity sensors 40, a rear door movement device 42 and a projector 44.

As shown in FIG. 5, the electronic controller 30 is directly connected to each of the control panel 32, the wireless communication device 34, the keyfob sensor array 36, the movement detection sensor 38, the proximity sensors 40, the rear door movement device 42 and the projector 44.

The electronic controller 30 preferably includes a microcomputer with a sensor/data processing and door control program that processes signals from each of the control panel 32, the wireless communication device 34, the keyfob sensor array 36, the movement detection sensor 38 and the proximity sensors 40, and further controls operation of the rear door movement device 42 and the projector 44, as is described in greater detail below. The electronic controller 30 can also include other conventional components such as an input interface circuit, an output interface circuit, and storage devices such as a ROM (Read Only Memory) device and a RAM (Random Access Memory) device. The memory circuit stores processing results and control programs such as ones for rear door movement and projector operations that are run by the processor circuit. The electronic controller 30 is operatively coupled to the various elements and components of the vehicle rear door control system 12 in a conventional manner. The internal RAM of the electronic controller 30 stores statuses of operational flags and various control data. The internal ROM of the electronic controller 30 stores the data relating to each of the sensors connected thereto and data for control of the rear door movement device 42 and projector 44 for the various operations described herein below. The electronic controller 30 is capable of selectively controlling any of the components of the control system of the electronic controller 30 in accordance with the control program. It will be apparent to those skilled in the art from this disclosure that the precise structure and algorithms for the electronic controller 30 can be any combination of hardware and software that will carry out the functions of the present invention.

The data processed and operations conducted by the electronic controller 30 are described further below following a description of the control panel 32, the various above-mentioned sensors, the rear door movement device 42 and the projector 44.

As shown in FIG. 4, the control panel 32 is preferably installed within a passenger compartment of the vehicle 10, on an instrument panel, or in a center console (not shown) of the vehicle 10 such that a vehicle operator or passenger (an individual) can access the control panel 32. The control panel 32 is configured to receive data and selections inputted by the individual (the vehicle operator or passenger). The control panel 32 can be configured to allow editing, entering and change of data relating to the operations of the electronic controller 30, including settings related to control of rear door movement device 42 and control of the projector 44. For example, the control panel 32 can be configured to allow the individual to switch between enabling of automatic operation of the rear door 24 and disabling automatic operation of the rear door 24; entering information relating to movement gestures and conforming gestures detected by the movement detection sensor 38 and/or the proximity sensors 40; enable and set up or pair communications between the wireless communication device 34 and a mobile device M, where the mobile device M is a mobile phone or a tablet; and enter information regarding individuals (with an authorized keyfob K) that fine tunes and confirms conforming movement gestures that are to be recognized by the electronic controller 30. A more detailed description of movement gestures and conforming gestures is provided herein below.

The wireless communication device 34 can include any of a number of communication protocols and devices. For example, the wireless communication device 34 can be, or can include one or more of the following: a Bluetooth®, WiFi™ and/or cellular telephone communications devices. The wireless communication device 34 is further configured to enable communication between the mobile device M and the electronic controller 30. For example, the wireless communication device 34 can enable the electronic controller 30 to receive programming and input settings (such as those set using the control panel 32), and well as enter or edit image and text information to be used by the electronic controller 30 when operating the projector 44. Further, the mobile device M can be provided with an "app" or application (i.e., a computer program) that is specifically engineered to provide a data communications link between the electronic controller 30 and the mobile device M. Specifically, the mobile device M can perform the functions of the control panel 32, and allow for input of images and text to the electronic controller 30 for use during operation of the projector 44.

The keyfob sensor array 36 (FIG. 5) includes and is defined by keyfob sensors 36*a*, 36*b*, 36*c* and 36*d* that are installed at various locations on the vehicle body structure 14, as shown in FIG. 4. The keyfob sensor array 36 is configured to detect proximity of each of the authorized keyfobs K of the vehicle 10, and thereby detect the presence of the individual in possession of any one of the authorized keyfobs K. The keyfob sensor array 36 and the electronic controller 30 are additionally configured to provide wireless entry to the passenger compartment of the vehicle 10 in a conventional manner. The signals from the keyfob sensor array 36 provide the electronic controller 30 with data used to determine the location of the keyfob K (and the individual in possession of the keyfob K) relative to the various exterior surfaces of the vehicle 10. Since keyfobs, keyfob sensor arrays and operation of systems that detect the presence and proximity of keyfobs are conventional, further description is omitted for the sake of brevity.

Figure 8:
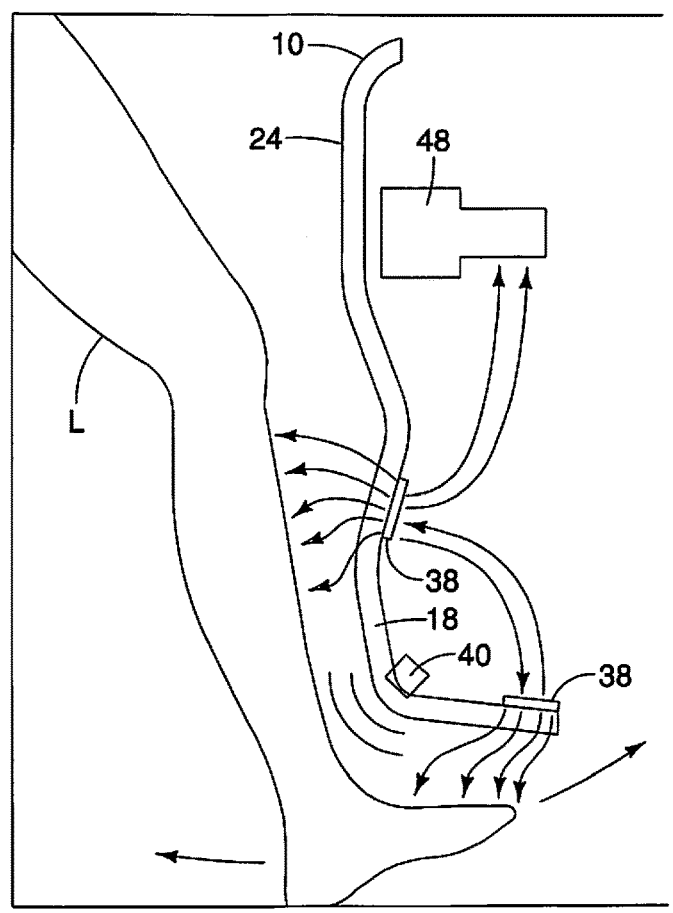
FIG. 8 is a schematic diagram showing the area of the vehicle around a rear bumper assembly and rear door of the vehicle, showing the gesture detection sensors and the proximity sensor(s), along with a default kicking movement gesture in accordance with the first embodiment.
Figure 9:
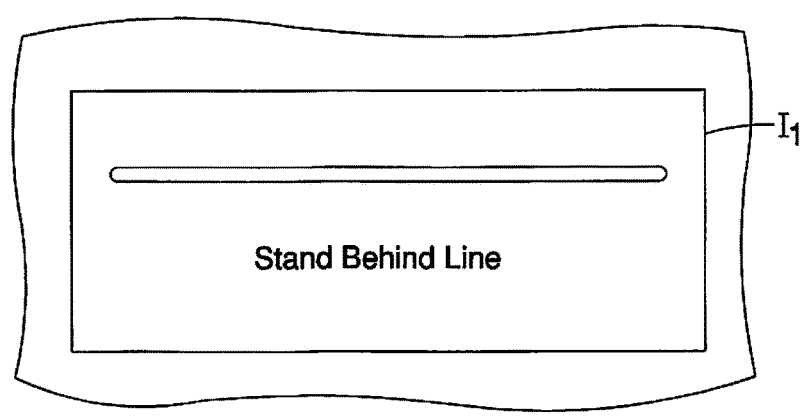
FIG. 9 is a schematic diagram showing a first image projected by the projector indicating a prescribed area rearward of the vehicle where an individual is to stand during automatic opening of the rear door in accordance with the first embodiment.

The movement detection sensor 38 a movement detection sensor or sensors installed to the vehicle body structure at and/or below the rear door 24, as shown in FIGS. 4 and 8. Depending upon the technology used to define the movement detector sensor 38, the movement detector sensor 38 can include one sensor or a plurality of sensors. In FIGS. 4 and 8, the movement detector sensor 38 includes two elongated rod-shaped elements that are connected to the electronic controller 30.

The movement detector sensor 38 are designed to detect movements made within a predetermined area or prescribed area below and/or adjacent to a rear end of the vehicle 10. The movement detector sensors 38 can be any of a variety of sensors that detect movement, such as sonar based sensors, light reflection detecting sensors, video cameras and/or capacitive sensors. In the depicted embodiment, the movement detector sensor 38 are capacitive sensors. Capacitive sensors include a sensor electrode or multiple electrodes which can detect an object in a "detection area" space in front of the sensor electrode(s). In one type of system, for example, a control and evaluation circuit is coupled to the sensor electrode and detects a change in the capacitance of the sensor electrode with respect to a reference potential. These sensors can be coupled to a non-metallic portion of the vehicle, such as the region of a lower sill area, lower fender or bumper. In the present embodiment, for example, a kicking movement, a pivoting movement or side to side movement of a leg and/or foot under and/or adjacent to the rear bumper 18 is a movement gesture.

Further, the movement detector sensor 38 are able to measure movement speed of the individual's foot and/or leg during the movement gesture. As well, the movement detection sensor 38 is configured to measure movement direction of the individual's foot and/or leg during the movement gesture, and measure movement speed of the movement gesture. The movement detector sensor 38 detects the movement gesture that is evaluated by the electronic controller 30 in a manner described further below.

The proximity sensor 40 is installed to the vehicle 10 proximate or below the rear door 24, as shown in FIG. 8. The proximity sensor 40 can include only one sensor, as shown in FIG. 8, or can be a plurality of sensors spaced apart from one another along the width of the rear bumper assembly 18. The proximity sensor 40 is configured to measure distance between the sensor 40 and the individual's foot and/or leg during a movement gesture. The proximity sensor 40 can be an optional feature. If omitted, the function of the proximity sensor 40 can be achieved using the sonar sensors 46 and/or the camera 48.

The rear door movement device 42 is mechanically connected to the rear door 24 in a convention manner, and is configured to move the rear door 24 between the closed orientation and the open orientation when operated by the electronic controller 30.

The projector 44 is installed to the vehicle body structure 14 proximate the rear door 24. For example, the projector 44 can be installed to the rear door 24, an underside of the vehicle body structure 14 adjacent to the rear bumper assembly 18, or can be installed to the rear bumper assembly 18 itself. The projector 44 is aimed to project images to a ground surface rearward of the vehicle body structure 18 proximate and/or rearward of the rear door 24.

Figure 2:
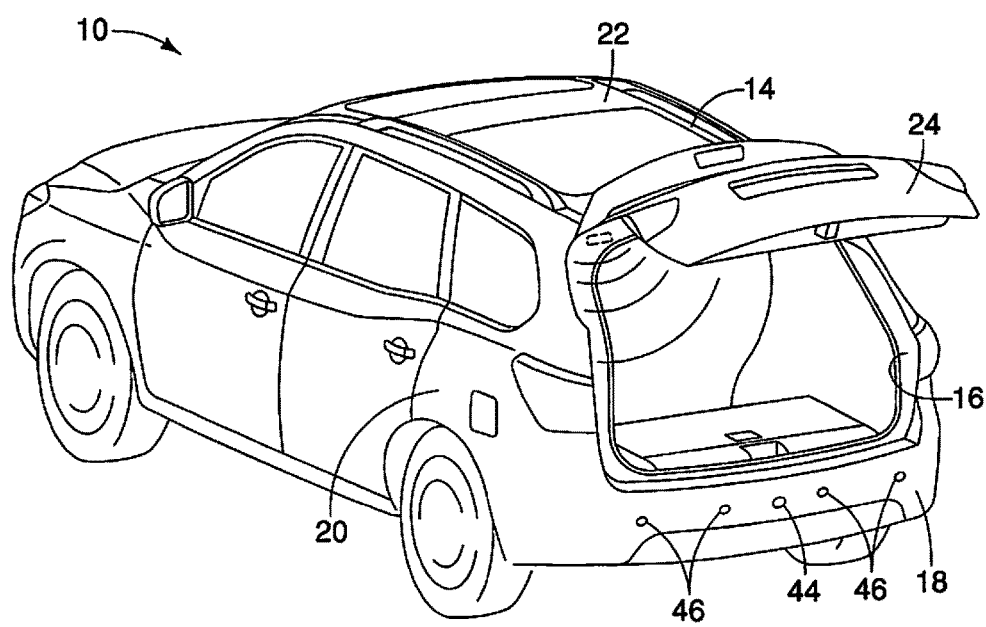
FIG. 2 is another perspective view of the rear portion of the vehicle showing the rear door in an open orientation in accordance with the first embodiment.

The sonar sensors 46 are installed at spaced apart locations along the rear bumper assembly 18, as shown in FIGS. 1-3 and are used along with the camera 48 with a parking assist/backing up system in a conventional manner. The camera 48 is installed to the rear door 24 above the rear bumper assembly 18 and is aimed to capture images rearward of the vehicle 10 in a conventional manner.

Figure 6:
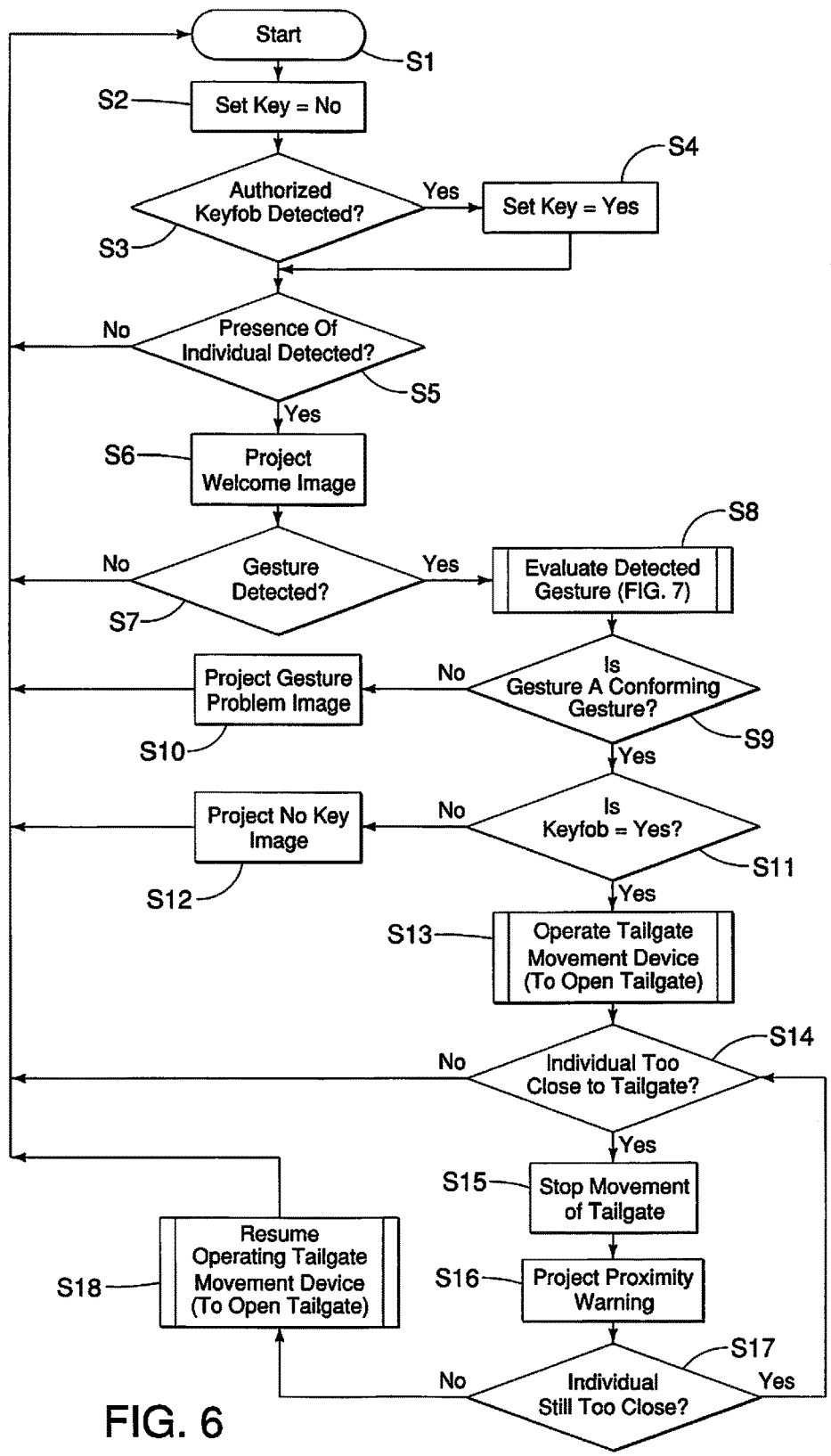
FIG. 6 a first flowchart showing an example of basic logic of the rear door control system carried out by the electronic controller in accordance with the first embodiment.
Figure 7:
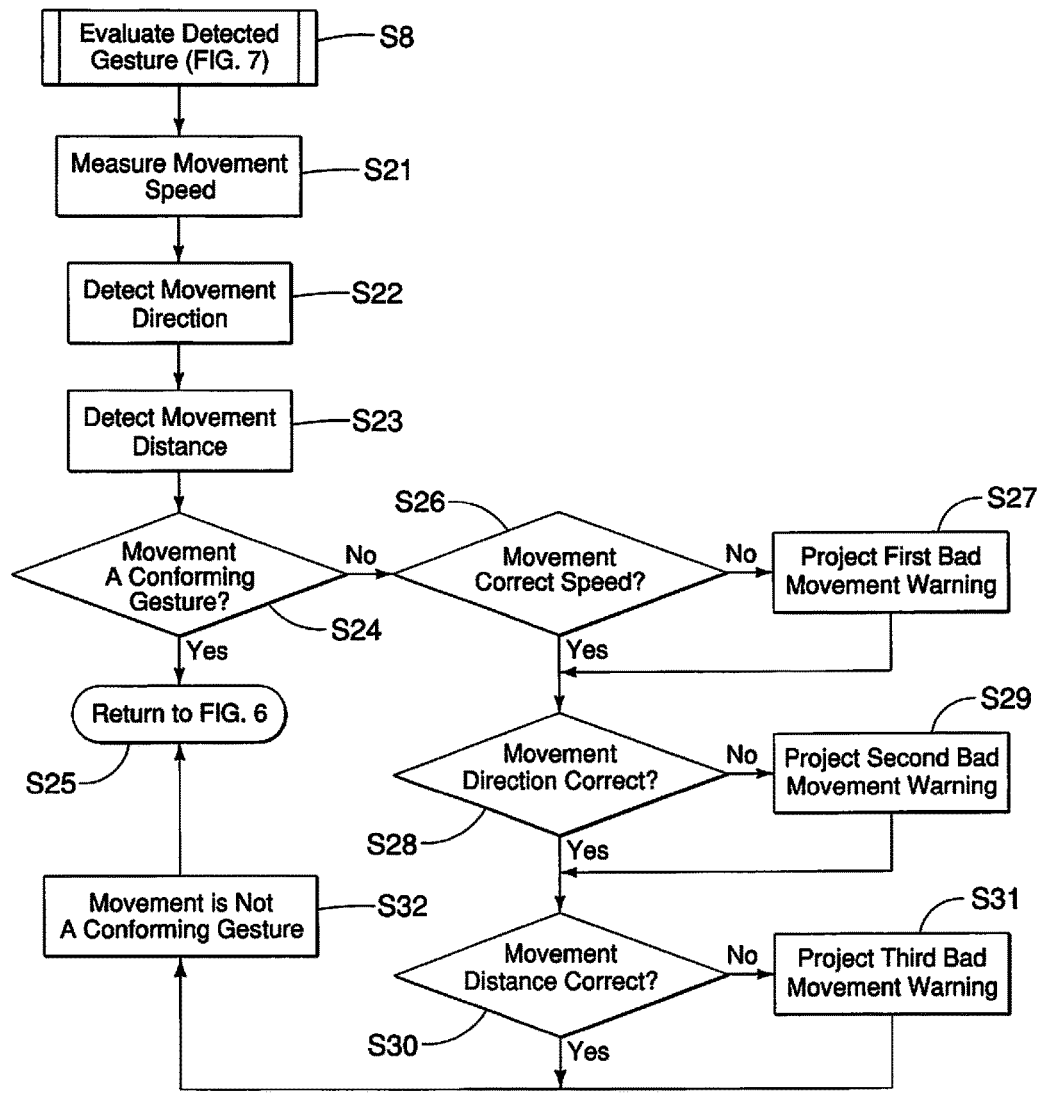
FIG. 7 a second flowchart showing a further example of basic logic of the rear door control system carried out by the electronic controller in accordance with the first embodiment.

The electronic controller 30 is configured to receive and process data, images and signals (information) from the control panel 32, the wireless communication device 34, the keyfob sensor array 36, the movement detection sensor 38, the proximity sensors 40, the rear door movement device 42, the sonar sensors 46 and the camera 48. The electronic controller 30 is also configured to operate the projector 44 in a manner described further below. An example of logic used by the electronic controller 30, as depicted in the flowcharts in FIGS. 6 and 7, is described in greater detail following a descriptions of various operations conducted by the electronic controller 30.

For example, the electronic controller 30 can determine whether or not an authorized keyfob is present in response to signals from the keyfob sensor array 36. The electronic controller 30 can determine whether or not a detected movement gesture is a conforming gesture using various combinations of criteria, depending upon which sensors are included installed to the vehicle 10. For example, the electronic controller 30 can determine whether or not the movement speed of the movement gesture falls within a predetermined speed range. The electronic controller 30 can determine whether or not a detected movement gesture is a conforming gesture in response to determining whether or not the movement direction of the movement gesture conforms to a predetermined direction of movement. The electronic controller 30 can determine whether or not the movement gesture is a conforming gesture in response to determining whether or not the measured distance conforms to a predetermined distance range. The electronic controller 30 can determine whether or not an individual is standing within a prescribed location relative to the rear door, and can use that information in determining whether or not a detected movement gesture is a conforming gesture.

The electronic controller 30 can also determine whether a selection or data entry made at the control panel 32 or by the mobile device M enables automatic operation of the rear door 24 or disables automatic operation of the rear door 24. The electronic controller 30 is configured such that in response to determining the presence of an authorized keyfob, that the movement gesture is a conforming gesture and that the selection at the control panel includes enables automatic operation of the rear door, the electronic controller operates the rear door movement device 42 to open the rear door 24.

The electronic controller 30 is also configured such that in response to determining the presence of an authorized keyfob, that the movement gesture is a conforming gesture and that the selection at the control panel 32 includes disabling automatic operation of the rear door, the electronic controller 30 does not operate the rear door movement device 42 to open the rear door 24 and further operates the projector 44 to project an image indicating that automatic operation of the rear door is disabled.

The electronic controller 30 is configured to operate the projector 44 to display a welcome image I in response to signals from the keyfob sensor array 36 indicating that the authorized keyfob has been detected, in further response to signals from the movement detection sensor 38 indicating that an individual is located proximate the rear door 24, and further control operation of the rear door movement device 42 to open the rear door 24 in response to detection of a conforming gesture detected by the movement detection sensor. The welcome image I can be any of a variety of texts and/or images. The tests and images can be default images stored in memory of the electronic controller 30, or can be texts and/or images inputted by vehicle operator or passenger (an individual) using the mobile device app, or control panel 32. For example, the welcome image I can be a graphic welcoming the individual such as an image of a sunrise, a company logo, or merely the word "Welcome". The welcome image I can be a personal message inputted to the electronic controller 30 by the individual or a message relating to a specific condition detected by the electronic controller 30 based on signals from one of the above-mentioned sensors.

Figure 10:
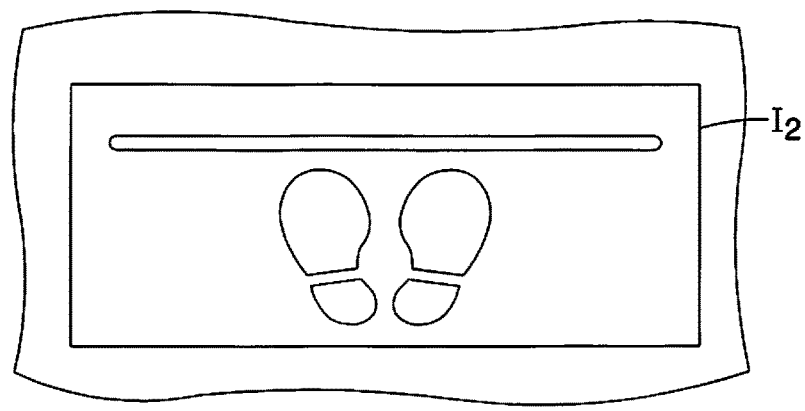
FIG. 10 is a schematic diagram showing a second image projected by the projector indicating the prescribed area rearward of the vehicle where an individual is to stand during automatic opening of the rear door in accordance with the first embodiment.
Figure 11:
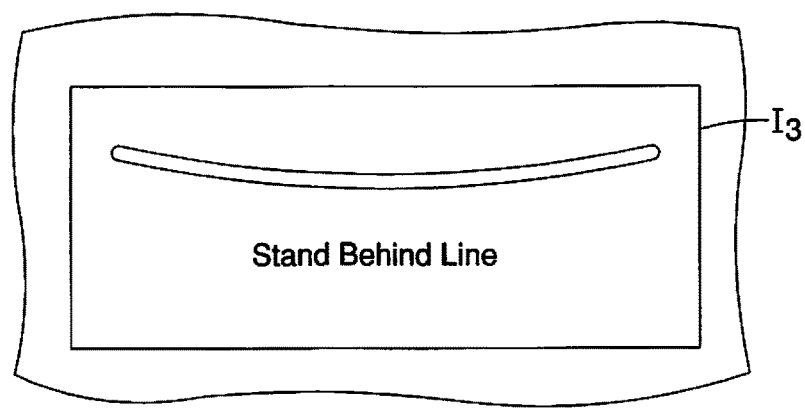
FIG. 11 is a schematic diagram showing a third image projected by the projector indicating the prescribed area rearward of the vehicle where an individual is to stand during automatic opening of the rear door in accordance with the first embodiment.
Figure 12:
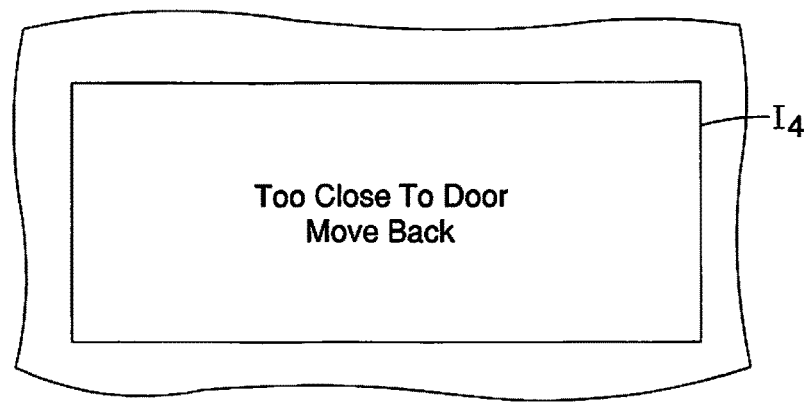
FIG. 12 is a schematic diagram showing a fourth image projected by the projector indicating the prescribed area rearward of the vehicle where an individual is to stand during automatic opening of the rear door in accordance with the first embodiment.

The electronic controller 30 is also configured to operate the projector 44 to project a position image, such as images $I_1$, $I_2$, $I_3$ and/or $I_4$ shown in FIGS. 9-12), to the ground surface alerting the individual to stand rearward of a portion of the positioning image during opening of the rear door 24. Specifically, prior to opening the rear door 24, the electronic controller 30 also determines whether or not the individual at the rear of the vehicle is in the predetermined area relative to the arc of movement of the rear door 24 as is opens, as shown in FIG. 3. In other words, the electronic controller 30 determines whether or not the individual is too close to the rear of the vehicle 10 during opening of the rear door 24 before the rear door 24 is actually opened (is there sufficient clearance for the rear door 24 to be opened). If the individual is too close to the rear door 24, the step-back image can include a representation of feet where the individual can stand (FIG. 10).

For instance, the electronic controller 30 can operate the projector to display a step-back image or text in response to signals from the keyfob sensor array 36 indicating that the authorized keyfob K has been detected in combination with the proximity sensor 40 indicating that the individual is at a location that is not rearward of a prescribed location relative to the rear door 24, or not within a predetermined area. The step-back image can be, for example, the image $I_2$ of a line with feet displayed adjacent to the line indicating an optimal location where the individual should be standing, as shown in FIG. 10. Other step-back images, such as the images $I_3$ and $I_4$ in FIGS. 11 and 12, include a text message.

The electronic controller 30 is configured to control operation of the rear door movement device 42 to open the rear door 24 in response to detection of an individual has the authorized keyfob and detection of a conforming gesture detected by the movement detection sensor 38.

The electronic controller 30 is further configured such that in response to detecting that a movement gesture is not a conforming gesture, the projector 44 can include images that represent a path a foot of the individual is to follow in order to produce the conforming gesture as detected by the movement detection sensor 38 and/or the proximity sensor 40.

The electronic controller 30 is configured with a default conforming gesture that includes movement of an individual's foot and/or leg as indicted by the arrows in FIG. 8. The default conforming gesture is basically a kicking motion with the foot of the leg L moving forward and rearward along a path that is parallel or along a vehicle longitudinal direction of the vehicle 10. The movement detection sensor 38 alone and/or in combination with the proximity sensor 40 detect movement of the individual's foot and/or leg L and transmit corresponding signals to the electronic controller 30. The electronic controller 30 then determines whether or not the movement gesture of the individual's foot and/or leg is a conforming gesture that enables the electronic controller 30 to operate the rear door movement device 42 to open.

Figure 13:
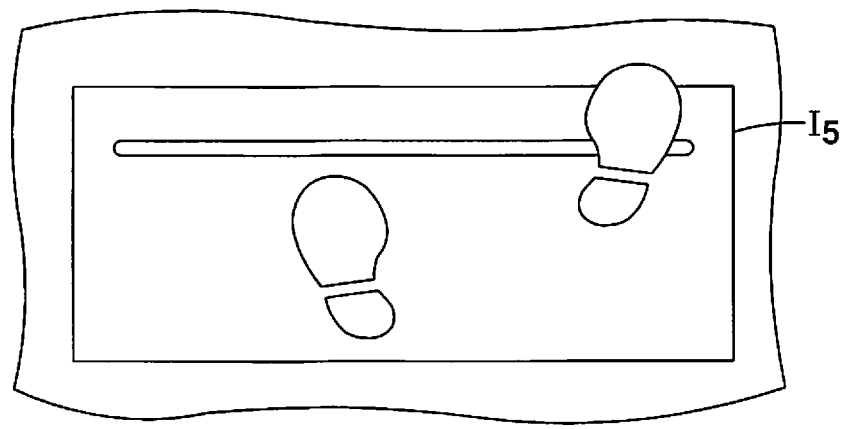
FIG. 13 is a schematic diagram showing a fifth image projected by the projector indicating a starting point for a first optional movement gesture in accordance with the first embodiment.
Figure 14:
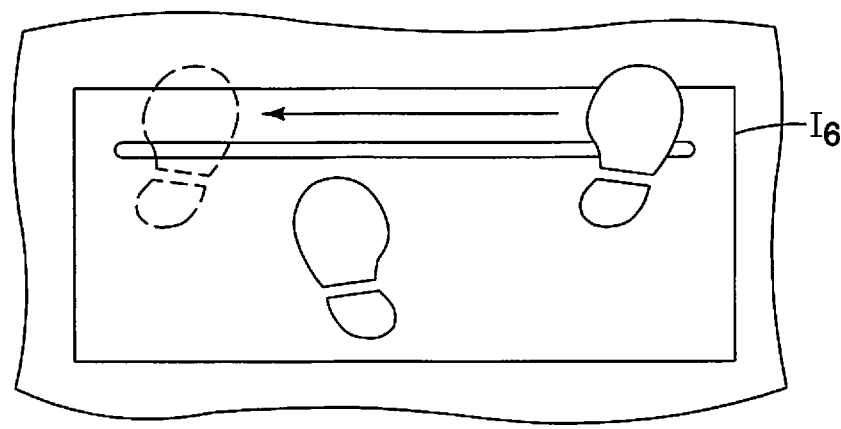
FIG. 14 is a schematic diagram showing a sixth image projected by the projector indicating a finishing point for the first optional movement gesture in accordance with the first embodiment.
Figure 15:
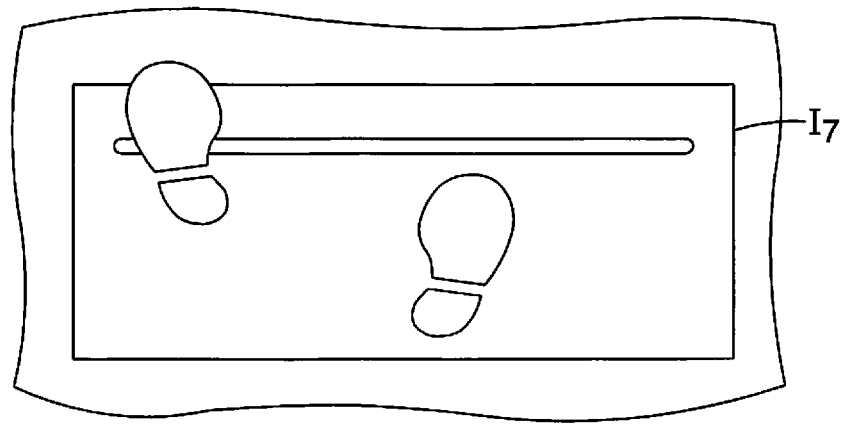
FIG. 15 is a schematic diagram showing a seventh image projected by the projector indicating a starting point for a second optional movement gesture in accordance with the first embodiment.
Figure 16:
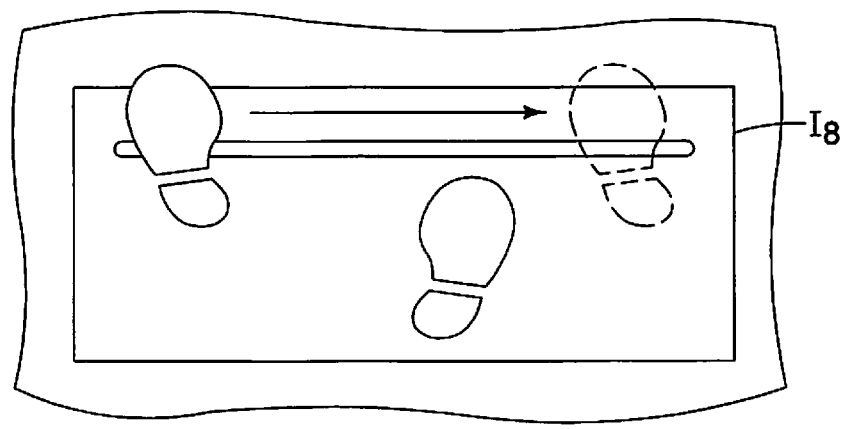
FIG. 16 is a schematic diagram showing an eighth image projected by the projector indicating a finishing point for the second optional movement gesture in accordance with the first embodiment.

In addition to the default conforming gesture described above and shown in FIG. 8, optional conforming gestures can be selected for use by the electronic controller 30 by making a conforming gesture selection or entry via the control panel 32 or via an app installed to the mobile device M. Examples of optional conforming gestures can include right to left movement of the foot or leg L as shown in FIGS. 13 and 14, or left to right movement of the foot or leg L as shown in FIGS. 15 and 16. Further, via the control panel 32 or the app installed to the mobile device M, an individual can adjust a default speed, distance and/or of the conforming gesture. For example, one individual may want to make a rapid side to side motion or rapid kicking motion. Another individual may want to make slower motion gesture, or a gesture closer or further from the rear bumper assembly 18 that the speed or distance default values. Any changes can be made as per the vehicle operator's (or individual's) desired requirements and preferences.

The vehicle operator or individual can further use the control panel 32 or the app installed to the mobile device M to enable or disable the automatic features of the vehicle rear door control system 12. In the disabled mode, the rear door 24 must be opened by, for example, pushing a command button on the authorized keyfob K, or press a button on the control panel 32. In the disabled mode, the steps described below with reference to FIGS. 6 and 7 are disabled. In the enabled mode, the steps described below with reference to FIGS. 6 and 7 are enabled.

In the event that the individual forgets the selected conforming gesture, in response to detection of a movement gesture that cannot be identified as the currently selected movement gesture, the electronic controller 30 can display images via the projector 44 that identify the currently selected conforming gesture. For example, a first optional conforming gesture can be displayed by the projector 44 for right handed (or right footed) individuals as shown in FIGS. 13 and 14 where the conforming gesture includes movement of the foot or leg L from the right to the left, as shown in images $I_5$ and $I_6$ (FIGS. 13 and 14). A second optional conforming gesture can be displayed by the projector 44 for left handed (or left footed) individuals as shown in FIGS. 15 and 16 where the conforming gesture includes movement of the foot or leg L from the left to the right, as shown in images $I_7$ and $I_8$ (FIGS. 15 and 16).

In the event that the electronic controller 30 determines that a movement gesture has been attempted, but the detected movement gesture is a non-conforming movement gesture, the electronic controller 30 operates the projector 44 to display images relating problems identified by the electronic controller 30. These images relating to problems with the movement gesture can include, for example, the images $I_9$ thru $I_{14}$. Images 19 thru $I_{14}$, are discussed further below.

Figure 23:
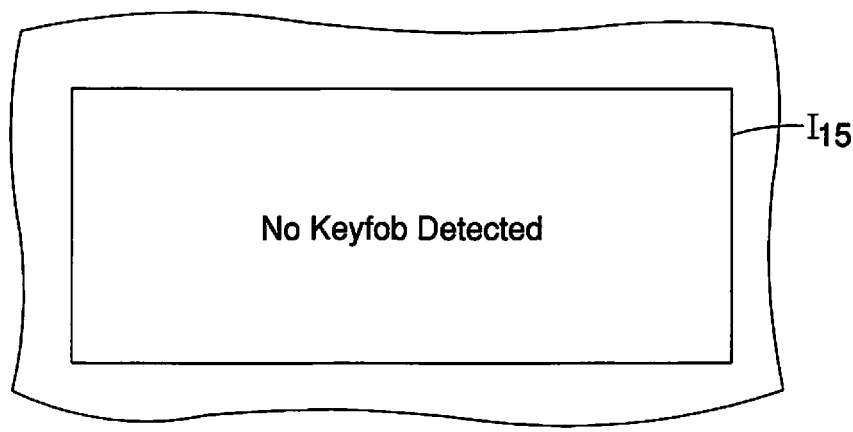
FIG. 23 is a schematic diagram showing a fifteenth image with text projected by the projector indicating that no authorized keyfob has been detected in accordance with the first embodiment.
Figure 24:
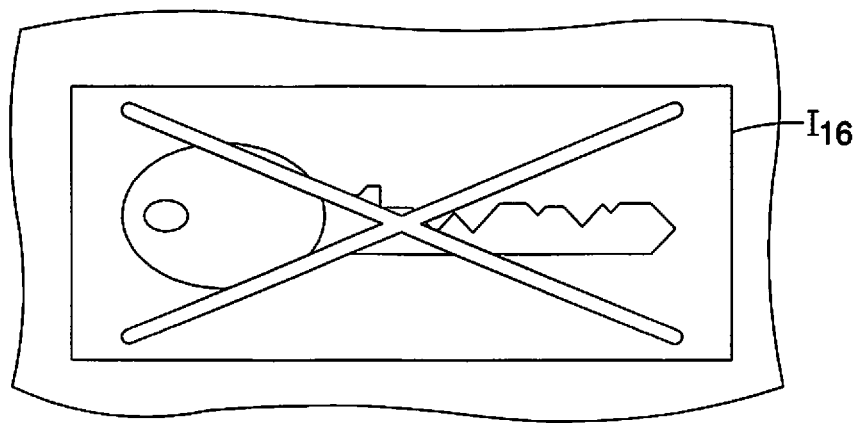
FIG. 24 is a schematic diagram showing a sixteenth image with only an image (an alternative to the fifteenth image) projected by the projector indicating that no authorized keyfob has been detected in accordance with the first embodiment.

If the electronic controller 30 determines that there is no authorized key-fob K present when movement gestures are being made or in response to indications that an individual is located proximate the rear door 24, then the electronic controller 30 operates the projector to display a No-Key image, such as the image 115 and/or the image $I_{16}$ shown in FIGS. 23 and 24.

The electronic controller 30 is also configured to determine whether or not the vehicle rear door control system 12 has been enabled or disabled by a vehicle operator or individual. If the vehicle rear door control system 12 has been enabled, then the operations described below with reference to FIGS. 6 and 7 are conducted. However, if the vehicle rear door control system 12 has been disabled, then the operations described below with reference to FIGS. 6 and 7 are not conducted, and instead the projector 44 is operated by the electronic controller 30 to display a message (an image) indicating that automatic operation of the rear door 24 has been disabled.

A further description of the electronic controller 30 is now provided with specific reference to FIGS. 6 and 7.

In FIG. 5, at step S1, the electronic controller 30 starts up and begins receiving data from the various sensors. At step S2, the electronic controller 30 initially sets a variable Key to be equal to No, for later use during the various operations described below. As step S3, the electronic controller 30 determines whether or not an authorized keyfob K has been detected via signals received from the keyfob sensor array 36. If yes, operation moves to step S4 where the values of the variable Key is now made equal to Yes. If no, operation moves to step S5.

At step S5, the electronic controller 30 determines whether or not an individual is present at the rear door 24 of the vehicle 10, via signals from one or more of the movement detection sensor 38, the proximity sensor 40, the sonar sensors 46, and/or the camera 48. If an individual is present, operation moves to step S6. If not, operation returns to step S1 for another iteration of the logic in FIG. 6.

At step S6, the electronic controller 30 operates the projector 44 and projects a selected one of the Welcome Messages. At step S7, the electronic controller 30 determines whether or not a movement gesture has been detected by the movement detection sensor 38 and/or the proximity sensor 40. If a movement gesture has been detected at step S7, operation moves to step S8. If no movement gesture has been detected, then operation returns to step S1 for another iteration of the logic in FIG. 6.

In step S8, the electronic controller 30 evaluates the signals received from the movement detection sensor 38 and/or the proximity sensor 40 and determines whether or not the movement gesture is a conforming gesture. The various steps and logic conducted by the electronic controller 30 are described in greater detail below with specific reference to FIG. 7.

Next, at step S9, the electronic controller 30 considers the results of the evaluation conducted in step S8 (FIG. 7). Specifically, the electronic controller 30 determines whether or not the detected movement gesture is a conforming gesture. If no, operation moves to step S10. If yes, operation moves to step S11.

At step S10, the electronic controller 30 operates the projector 44 and projects a corresponding gesture problem image, as determined at step S8 (FIG. 7), and then returns to step S1.

At step S11, the electronic controller 30 determines whether or not the variable Keyfob is equal to Yes. If not, operation moves to step S12. If yes, then operation moves to step S13.

At step S12, the electronic controller 30 operates the projector 44 and projects one of the No-Key images, such as one of images $I_{15}$ and $I_{16}$ shown in FIGS. 23 and 24, and then returns to step S1.

At step S13, the electronic controller 30 begins to operate the rear door movement device 42 in order to begin opening the rear door 24. At step S14, the electronic controller 30 determines whether or not the individual standing near the rear door 24 is too close to the rear door 24 (tailgate). If not, the rear door 24 is opened and operation returns to step S1. If so, then operation moves to step S15 where movement of the rear door 24 is stopped. Next, in step S16, the electronic controller 30 operates the projector 44 and projects a proximity warning image, such as one of the images $I_1$ thru $I_4$ as shown in FIGS. 9-12.

At step S17, the electronic controller 30 again determines whether or not the individual standing near the rear door 24 is too close to the rear door 24 (tailgate). If yes, operation returns to Step S14, S25 and S16. If the individual has moved to the predetermined distance from the rear door 24, operation then moves to step S18 where movement of the rear door 24 toward the open orientation is resumed to completion. Thereafter, operation moves to step S1.

Next in the logic presented in FIG. 7, the electronic controller 30 evaluates signal from the various connected sensors and determines whether or not a detected movement gesture is the default or selected conforming gesture.

Beginning at steps S21, S22 and S23, the electronic controller 30 evaluates signals received from the movement detection sensor 38 and the proximity sensor 40. Specifically, at step S21, the electronic controller 30 measures and evaluates the movement speed of the movement gesture. At step S22, the electronic controller 30 detects and evaluates the movement direction of the movement gesture. At step S23, the electronic controller 30 detects and evaluates the movement distance of the movement gesture.

It should be understood that the specific movement speed, the movement direction and the movement distance can be predetermined along with the default conforming gesture shown in FIG. 8, or can be selected by the vehicle operator and adjusted by the vehicle operator using the control panel 32 or the app installed on the mobile device M.

At step S24, the compares the data evaluated in steps S21, S22 and S23 with the default data, or with data (user data) entered by an individual (vehicle operator) via the control panel 32. If the speed, direction and distance of the detected movement gesture conform with default or entered user data, then the movement gesture is determined to be a conforming gesture at step S24. Operation moves to step S25, where operation is directed back to FIG. 6 after step S8. If any one of the speed, direction and distance of the detected movement gesture fails to conform with default or entered user data, then the movement gesture is not a conforming gesture. At this point, operation moves to step S26.

Figure 17:
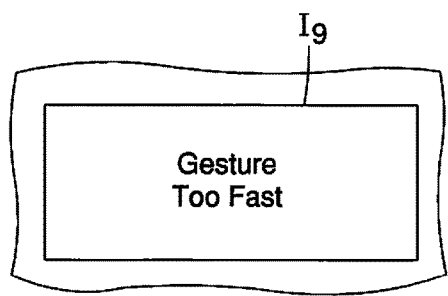
FIG. 17 is a schematic diagram showing a ninth image projected by the projector indicating that a detected movement gesture was too fast in accordance with the first embodiment.
Figure 18:
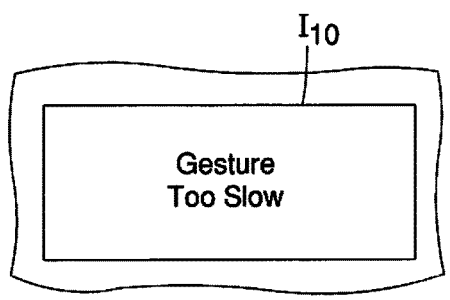
FIG. 18 is a schematic diagram showing a tenth image projected by the projector indicating that a detected movement gesture was too slow in accordance with the first embodiment.

At step S26, the electronic controller 30 determines whether or not the movement gesture speed was within a range indicating a correct speed, as compared to a default speed range and/or user data speed range. If no, operation moves to step S27. If yes, operation moves to step S28. At step S27, the projector 44 is operated to project a first bad movement warning, such as a corresponding one of image $I_9$ or $I_{10}$ shown in FIGS. 17 and 18.

Figure 21:
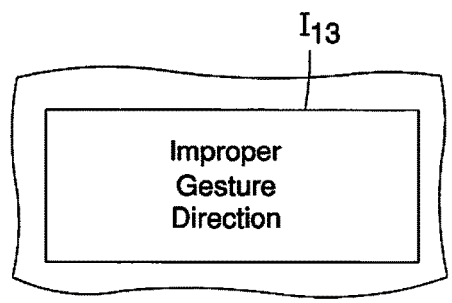
FIG. 21 is a schematic diagram showing a thirteenth image projected by the projector indicating that a detected movement gesture included movement that was not in the correct direction of movement in accordance with the first embodiment.

At step S28, the electronic controller 30 determines whether or not the movement gesture direction was correct, as compared to s default direction and/or user data direction. If no, operation moves to step S29. If yes, operation moves to step S30. At step S29, the projector 44 is operated to project a second bad movement warning, such as image $I_{21}$ shown in FIG. 21.

Figure 19:
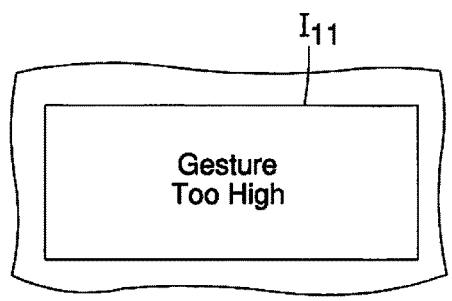
FIG. 19 is a schematic diagram showing an eleventh image projected by the projector indicating that a detected movement gesture was too high off the ground in accordance with the first embodiment.
Figure 20:
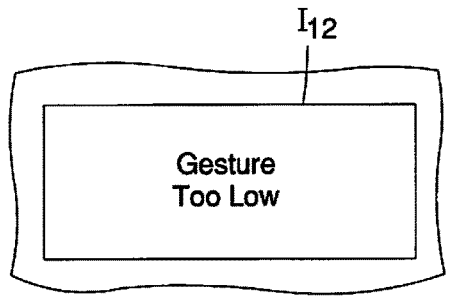
FIG. 20 is a schematic diagram showing a twelfth image projected by the projector indicating that a detected movement gesture was too low relative to the ground in accordance with the first embodiment.

At step S30, the electronic controller 30 determines whether or not the movement gesture distance was correct, as compared to a default distance and/or user data distance. If no, operation moves to step S32. If yes, operation moves to step S31. At step S31, the projector 44 is operated to project a third bad movement warning, such as a corresponding one of image $I_{11}$ or $I_{12}$ shown in FIGS. 19 and 20.

Figure 22:
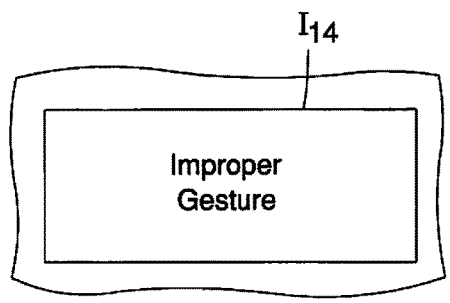
FIG. 22 is a schematic diagram showing a fourteenth image projected by the projector indicating that a detected movement gesture was an improper gesture in accordance with the first embodiment.

At step S32, the electronic controller 30 determines that the movement gesture is not a conforming gesture and can optionally operate the projector 44 to project the image 114 shown in FIG. 22.

The various vehicle features and elements (other than the vehicle rear door control system 12) are conventional components that are well known in the art. Since vehicle features and elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle rear door control system. Accordingly, these terms, as utilized to describe the present invention should be interpreted relative to a vehicle equipped with the vehicle rear door control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A rear door control system, comprising:
   a vehicle body structure having an opening and a rear door that is movable between a closed orientation covering the opening and an open orientation exposing the opening;
   a rear door movement device configured to move the rear door between the closed orientation and the open orientation;
   a keyfob sensor array installed to the vehicle body structure configured to detect proximity of an individual with an authorized keyfob;
   a movement detection sensor installed to the vehicle body structure below the rear door, the movement detection sensor being configured to detect direction of movement of a movement gesture and detect distance of the movement from the movement detection sensor;
   a projector installed to the vehicle body structure proximate the rear door and aimed to selectively project a plurality of images to a ground surface rearward of the vehicle body structure proximate the rear door, the plurality of images projected by the projector include images selected from at least the following group of images: an image indicating that the movement of the movement gesture did not include movement in a predetermined direction; or, the image indicating that the movement gesture did not include movement within a predetermined distance range from the movement detection sensor; and an electronic controller connected to rear door movement device, the keyfob sensor array, the movement detection sensor, and the projector, the electronic controller determining whether or not the authorized keyfob is present in response to signals from the keyfob sensor array;

the electronic controller determining whether or not the movement gesture made by the individual standing within a prescribed location relative to the rear door is a conforming gesture, where the conforming gesture includes the movement detection sensor detecting that the movement gesture beneath the rear door is in a predetermined direction and is within a predetermined distance range from the movement detection sensor, and in response to determining that the movement gesture is a conforming gesture, the electronic controller operating the rear door movement device to open the rear door in further response to a determination that the authorized keyfob is present, in response to determining that the movement gesture is not a conforming gesture, the electronic controller determines whether or not the movement gesture was in the predetermined direction, and determines whether or not the movement gesture was within the predetermined distance range from the movement detection sensor, such that in response to determining that the movement gesture did not include movement in the predetermined direction, the electronic controller operates the projector to project the image indicating that the movement gesture did not include movement in the predetermined direction, leaving the rear door in the closed orientation, and in response to determining that the movement gesture was not within the predetermined distance range from the movement detection sensor, the electronic controller operates the projector to project the image indicating that the movement gesture did not include movement within the predetermined distance range from the movement detection sensor, leaving the rear door in the closed orientation.

2. The rear door control system according to claim 1, wherein
the movement detection sensor is configured to detect movement of the individual's foot or leg when detecting the movement gesture.

3. The rear door control system according to claim 2, wherein
the movement detection sensor is configured to measure movement speed of the individual's foot or leg during the movement gesture.

4. The rear door control system according to claim 3, wherein
the movement detection sensor is further configured to measure movement direction of the individual's foot or leg during the movement gesture.

5. The rear door control system according to claim 4, further comprising:
the movement detection sensor includes a proximity sensor installed to the vehicle proximate the rear door, the proximity sensor being configured to measure distance between the sensor and the individual's foot or leg during the movement gesture.

6. The rear door control system according to claim 1, wherein
the plurality of images projected by the projector further includes an image indicating that the movement gesture did not include movement within a predetermined speed range,
the movement detection sensor is configured to measure movement speed of the movement gesture,
the electronic controller determines whether or not the movement gesture is a conforming gesture in response to determining whether or not the movement speed of the movement gesture falls within a predetermined speed range, and
in response to the electronic controller determining that the movement gesture did not include movement within the predetermined speed range, the electronic controller operates the projector to display the image indicating that the movement gesture did not include movement within the predetermined speed range.

7. The rear door control system according to claim 1, wherein
the electronic controller determines that the movement gesture is a conforming gesture in response to determining whether or not the movement direction of the movement gesture conforms to the predetermined direction of movement.

8. The rear door control system according to claim 1, further comprising:
the movement detection sensor includes a proximity sensor installed to the vehicle proximate the rear door, the proximity sensor being configured to measure distance between the proximity sensor and the individual during the movement gesture, and
the electronic controller determines that the movement gesture is a conforming gesture in response to determining whether or not the measured distance conforms to the predetermined distance range.

9. The rear door control system according to claim 1, wherein
the electronic controller is configured to determine whether or not the individual is standing within a prescribed location relative to the rear door.

10. The rear door control system according to claim 9, wherein
the plurality of images projected by the projector further includes a position image alerting the individual to stand rearward of a portion of the positioning image during opening of the door, and
the electronic controller being further configured to operate the projector to project the position image to the ground surface alerting the individual to stand rearward of a portion of the positioning image during opening of the rear door.

11. The rear door control system according to claim 1, wherein
the plurality of images projected by the projector further includes a welcome image, and
the electronic controller is further configured to operate the projector to display the welcome image in response to signals from the keyfob sensor array indicating that the authorized keyfob has been detected.

12. The rear door control system according to claim 1, wherein
the plurality of images projected by the projector further includes a welcome image, and
the electronic controller is further configured to operate the projector to display the welcome image in response to signals from the keyfob sensor array indicating that the authorized keyfob has been detected and further in response to determining that the keyfob is located proximate the rear door.

13. The rear door control system according to claim 1, wherein
the plurality of images projected by the projector further includes a position image alerting the individual to stand rearward of a portion of the positioning image, and
the electronic controller is further configured to operate the projector to project the position image alerting the individual to stand rearward of a portion of the positioning image when the rear door is to be opened.

14. The rear door control system according to claim 1, wherein
the movement detection sensor is configured to measure distance of movement during of the movement gesture, and
the electronic controller determines that the movement gesture is a conforming gesture in response to determining whether or not the movement distance of the movement gesture conforms to a predetermined distance of movement.

15. The rear door control system according to claim 1, further comprising:
a wireless communication device connected to the electronic controller, the wireless communication device being configured to communicate with a handheld mobile device, and
the electronic controller is further configured to communication to the mobile device information corresponding to text and images projected by the projector.

16. A rear door control system, comprising:
a vehicle body structure having an opening and a rear door that is movable between a closed orientation covering the opening and an open orientation exposing the opening;
a rear door movement device configured to move the rear door between the closed orientation and the open orientation;
a keyfob sensor array installed to the vehicle body structure configured to detect proximity of an individual with an authorized keyfob;
a movement detection sensor installed to the vehicle body structure below the rear door;
a projector installed to the vehicle body structure proximate the rear door and aimed to selectively project a plurality of images to a ground surface rearward of the vehicle body structure proximate the rear door, the plurality of images projected by the projector include projecting images selected from at least the following group of images: a welcome image; a text image; an image indicating that no authorized keyfob is present; or a position image that provides the individual an indication of where to stand when making a gesture;
a control panel configured to receive data and selections inputted by the individual, including selection of enabling automatic operation of the rear door and disabling automatic operation of the rear door, and
an electronic controller connected to rear door movement device, the keyfob sensor array, the movement detection sensor, the projector and the control panel,
the electronic controller determining whether or not an authorized keyfob is present in response to signals from the keyfob sensor array, and in response to determining that the authorized keyfob is present, the electronic controller selects the welcome image and operates the projector to project the welcome image; and in response to determining that the authorized keyfob is not present, the electronic controller selects the image indicating that no authorized keyfob is present and operates the projector to project the image indicating no keyfob is present,
the electronic controller determining whether or not a movement gesture made by the individual standing within a prescribed location relative to the rear door is a conforming gesture, and in response to determining that the individual is not standing in the prescribed location relative to the rear door, the electronic controller selects the position image that provides the individual an indication of where to stand when making a gesture and operates the projector to project the position image that provides the individual an indication of where to stand when making a gesture,
the electronic controller determining whether the selection at the control panel includes enabling automatic operation of the rear door or disabling automatic operation of the rear door,
the electronic controller being configured such that in response to determining the presence of an authorized keyfob, that the movement gesture is a conforming gesture and that the selection at the control panel includes enables automatic operation of the rear door, the electronic controller operates the rear door movement device to open the rear door, and
the electronic controller being configured such that in response to determining the presence of an authorized keyfob, that the movement gesture is a conforming gesture and that the selection at the control panel includes disabling automatic operation of the rear door, the electronic controller does not operate the rear door movement device to open the rear door and further operates the projector to project an image indicating that automatic operation of the rear door is disabled.

17. The rear door control system according to claim 16, wherein
the electronic controller is further configured to operate the projector to display the no-key image in response to signals from the keyfob sensor array indicating that the authorized keyfob has not been detected in further response to signals from the movement detection sensor indicating that an individual is located proximate the rear door.

18. The rear door control system according to claim 16, wherein
the control panel is further configured to receive data and selections inputted by the individual corresponding to a predetermined direction of movement required for determining whether or not the movement gesture is a conforming gesture.

19. The rear door control system according to claim 18, wherein
the predetermined direction of movement is movement from a driver's side of the vehicle to a passenger's side of the vehicle.

20. The rear door control system according to claim 18, wherein
the predetermined direction of movement is movement from a passenger's side of the vehicle to a driver's side of the vehicle.

* * * * *